Dec. 24, 1968  T. J. BOTTOM  3,417,644
STRIP-FEEDING AND SHEARING MECHANISM
Filed Aug. 23, 1965  4 Sheets-Sheet 1

INVENTOR
THEODORE J. BOTTOM
BY
*Cohn and Powell*
ATTORNEYS

Dec. 24, 1968 T. J. BOTTOM 3,417,644
STRIP-FEEDING AND SHEARING MECHANISM
Filed Aug. 23, 1965 4 Sheets-Sheet 2

INVENTOR
THEODORE J. BOTTOM
BY Cohn and Powell
ATTORNEYS

Dec. 24, 1968    T. J. BOTTOM    3,417,644
STRIP-FEEDING AND SHEARING MECHANISM
Filed Aug. 23, 1965    4 Sheets-Sheet 3

INVENTOR
THEODORE J. BOTTOM
BY *Cohn and Powell*
ATTORNEYS

Dec. 24, 1968  T. J. BOTTOM  3,417,644
STRIP-FEEDING AND SHEARING MECHANISM
Filed Aug. 23, 1965  4 Sheets-Sheet 4

INVENTOR
THEODORE J. BOTTOM
BY *Cohn and Powell*
ATTORNEYS

United States Patent Office 3,417,644
Patented Dec. 24, 1968

3,417,644
STRIP-FEEDING AND SHEARING MECHANISM
Theodore J. Bottom, Kirkwood, Mo. (% Aluma-Kraft Manufacturing Co., 1030 Manchester Road, Manchester, Mo. 63011)
Filed Aug. 23, 1965, Ser. No. 481,714
16 Claims. (Cl. 83—230)

ABSTRACT OF THE DISCLOSURE

A strip-feeding and shearing mechanism which includes a means for feeding a strip across a cutting plane, defined by a blade mounted on a cutting head, and into a receiver attached to and movable with the cutting head. The strip engages a stop means connected to the receiver a predetermined distance from the cutting plane to move both the receiver and cutting head from one limit to another, whereby to maintain the strip length constant between the stop means and cutting plane. An electrical circuit is conditioned by the movement of the cutting head from the said one limit so as to halt the strip-feeding means. The strip-feeding means holds the cutting head in the said other limit by engagement of the strip with the stop means. The blade is actuated to shear the strip while the head is located in the said other limit, and the head is subsequently returned to the said one limit to condition the electrical circuit for starting the strip-feeding means.

---

This invention relates generally to improvements in a strip-shearing mechanism, and more particularly to an improved device for measuring and cutting a strip into precise lengths.

An important objective is achieved by the provision of a cutting head that is mounted for movement between limits, the head having a blade carried therewith and defining a cutting plane, and by the provision of feeding means delivering a strip across the cutting plane and into a receiver attached to and movable with the cutting head, the strip engaging a stop means connected to the receiver to move the receiver and cutting head from one limit to another.

Another important objective is realized by the structural arrangement in which the strip length between the stop means and cutting plane is maintained upon such movement of the cutting head and receiver between limits, the cutting head and receiver moving to compensate for any override of the strip-feeding means.

Still another important object is attained in that the strip-feeding means holds the strip in the extended position against the stop means in the receiver, and thereby holds the cutting head in the said other limit in which the blade shears the strip to the desired length.

An important objective is afforded by the provision of a means connected to the cutting head for returning the head to the said one limit, or its initial position, after severance of the strip by the blade, thereby conditioning the mechanism for subsequent operation.

Another important object is provided by the structural arrangement in which the blade engages the end of the strip upon severance of the strip length to preclude return of the cutting head to the said one limit until the blade is removed from the strip path, whereby to assure complete severance of the strip and the location of the severed strip length in the receiver before movement of the cutting head and receiver as a unit back to its original position.

Yet another important objective is achieved by the provision of an electrical circuit to control the power-operated strip-feeding means, the circuit including a switch deenergizing the circuit by movement of the cutting head from the one limit upon engagement of the stop means by the strip, whereby to halt the delivery of the strip by the feeding means.

An important object is realized by the provision of guide means on the cutting head which retain and direct the delivery of the strip across the cutting plane and into the receiver, the guide means retaining connection with the unsevered portion of the strip associated with the feeding means and directing that strip portion across the cutting plane upon return movement of the cutting head to its initial position.

Another important objective is attained by the provision of means that support and mount the elongate receiver for longitudinal movement with the cutting head between limits upon engagement of the stop means by the strip as it is fed into the receiver by the strip-feeding means. Specifically, the receiver-supporting means include legs that are pivotally attached to the receiver and seat on a subjacent surface such as the ground, the legs swinging to accommodate the longitudinal movement of the receiver.

Other important advantages are afforded by constructing the elongate receiver with a plurality of trough sections selectively connected together to provide a receiver of the desired length in order to accommodate and hold the severed strip lengths.

An important object is to provide a strip-feeding and shearing mechanism that is simple and durable in construction, economical to manufacture and assemble, highly efficient in operation, and which can be utilized by anyone with little or no instruction.

The foregoing and numerous other objects and advantages of the invention will more clearly appear from the following detailed description of a preferred embodiment, particularly when considered in connection with the accompanying drawings, in which.

Figure 1:
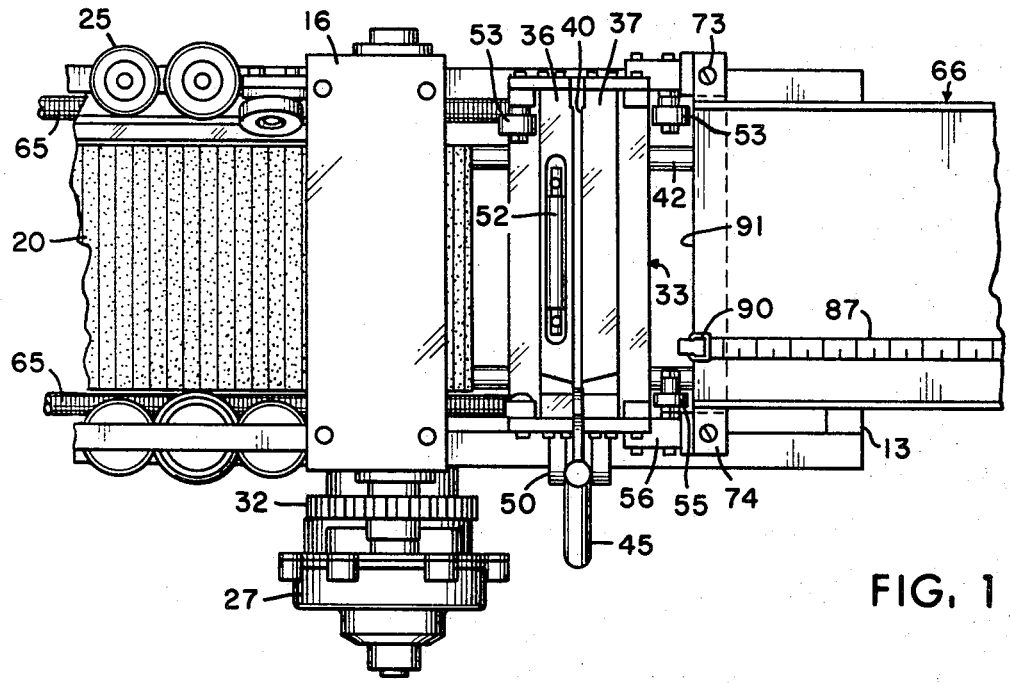
FIG. 1 is a fragmentary, top plan view of the strip-feeding and shearing mechanism.
Figure 2:
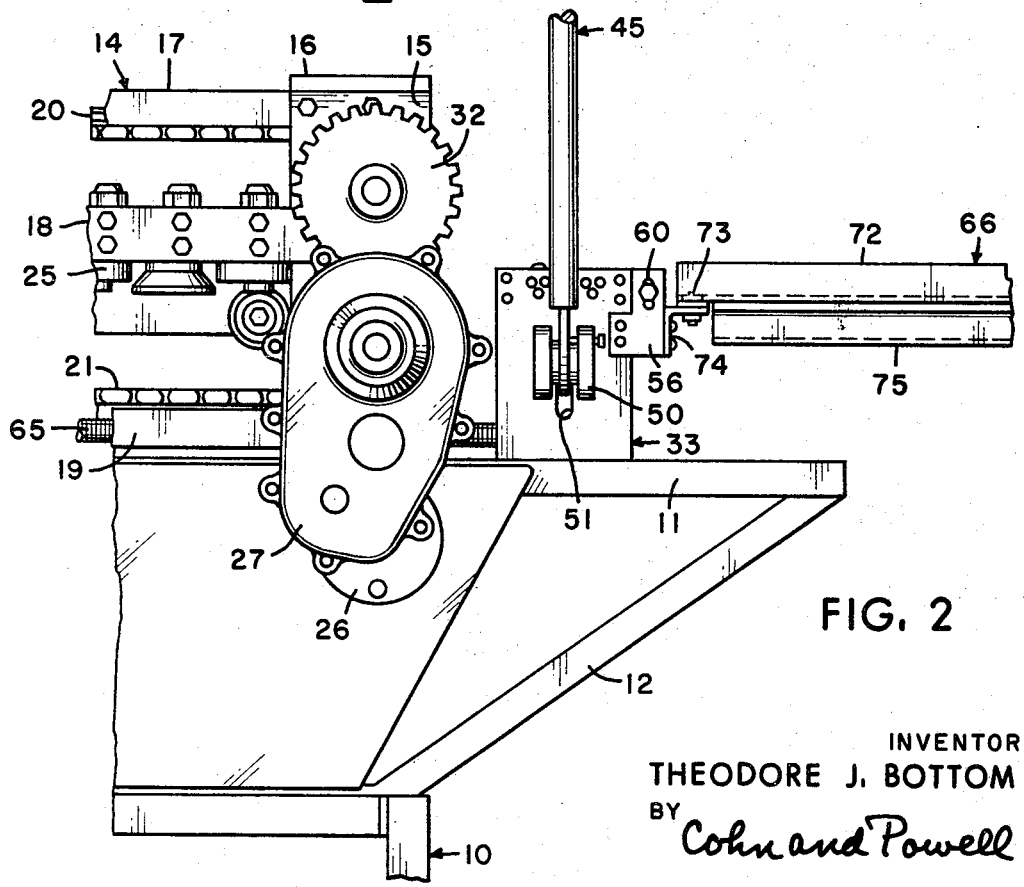
FIG. 2 is a side elevational view of the mechanism shown in FIG. 1.

Referring now by characters of reference to the drawings, and first to FIG. 2, it is seen that the machine includes a base frame 10 having an upper longitudinal rail 11 at each side supported at the front by an inclined brace 12, the rails 11 being operatively interconnected at the front end by a cross brace 13.

Mounted on the base frame 10 between the side rails 11 is a strip-forming and feeding unit, the detailed construction of which is fully described in U.S. Patent No. 3,319,448, issued May 16, 1967. Briefly, the strip-forming and feeding mechanism includes a box-like frame generally indicated at 14, having front, upright posts 15 at each side interconnected by a transverse top plate 16. A corresponding pair of posts and top plate at the rear of the machine (not shown) is operatively connected to the front posts 15 by longitudinal rails 17, 18 and 19 at each side, the rails 17, 18 and 19 being substantially horizontal and vertically spaced.

Figure 4:
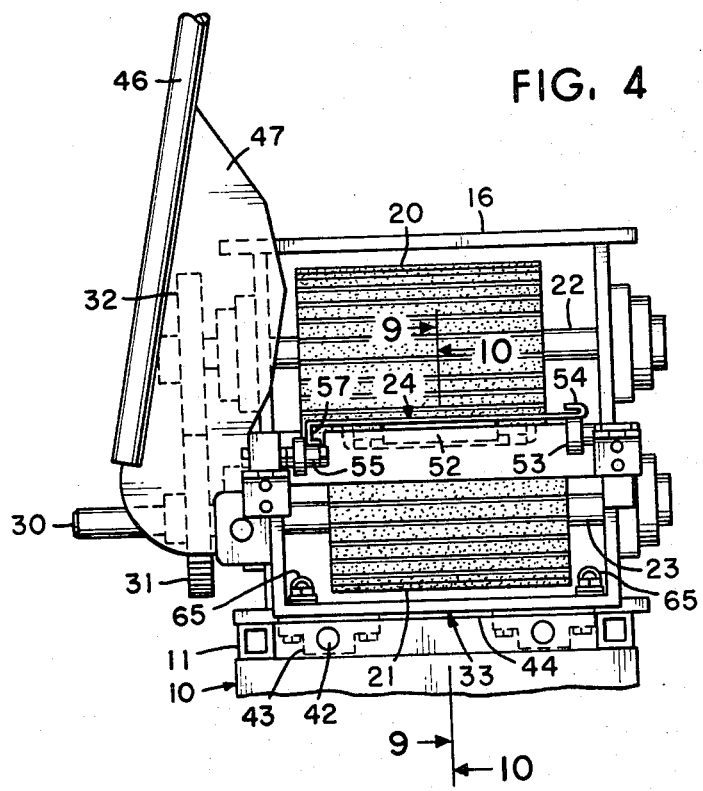
FIG. 4 is an end elevational view of the mechanism shown in FIG. 1, but with the receiver removed.

The strip-feeding means includes a pair of caterpillar-type belts 20 and 21. The upper belt 20 is rotatively mounted on and carried by a front shaft 22 extending between and journalled in the front posts 15, as best seen in FIG. 4. A similar shaft (not shown) mounts the opposite end of belt 20. The lower belt 21 is rotatively mounted on and carried by a front shaft 23 extending between and journalled on the front posts 15. A similar shaft (not shown) rotatively mounts the opposite end of the belt 21.

A continuous strip 24 (FIG. 4) is gripped between the adjacent spans of the belts 20 and 21, the belts 20 and 21 gripping the strip therebetween and delivering the strip out the discharge end of the machine. While the strip 24 is gripped by the belts 20 and 21 and is transported through the machine, the lateral edges of such strip 24 are deformed into suitable and desired channels and flanges by a plurality of forming rolls 25 mounted on the side rails 18. In the embodiment shown, the strip 24 is formed into a shape suitable for siding.

A power unit is provided to drive the belts 20 and 21 in order to feed the formed, continuous strip 24 out the discharge end of the machine. This power unit includes an electric motor 26 operatively connected through a gear-speed reducing unit 27 to a drive shaft 30 that is coupled to the end of the lower belt shaft 23. A drive gear 31 is drivingly connected to and mounted on the drive shaft 30, the gear 31 meshing with a coacting gear 32 mounted on an extension of belt shaft 22. Upon energization of the motor 26, the meshing gears 31 and 32 rotate their associated belt shafts 23 and 22 respectively in order to drive the belts 21 and 20 in synchronization to feed the continuous strip 24 therebetween.

Figure 9:
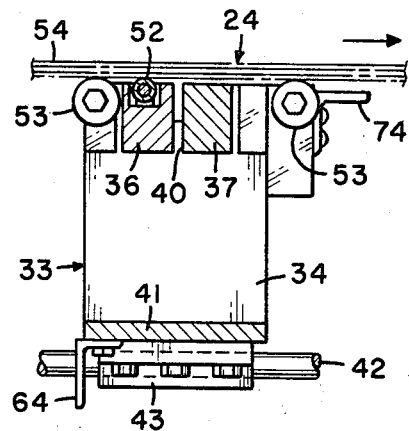
FIG. 9 is a cross sectional view of the cutting head as seen along line 9—9 of FIG. 4.
Figure 5:
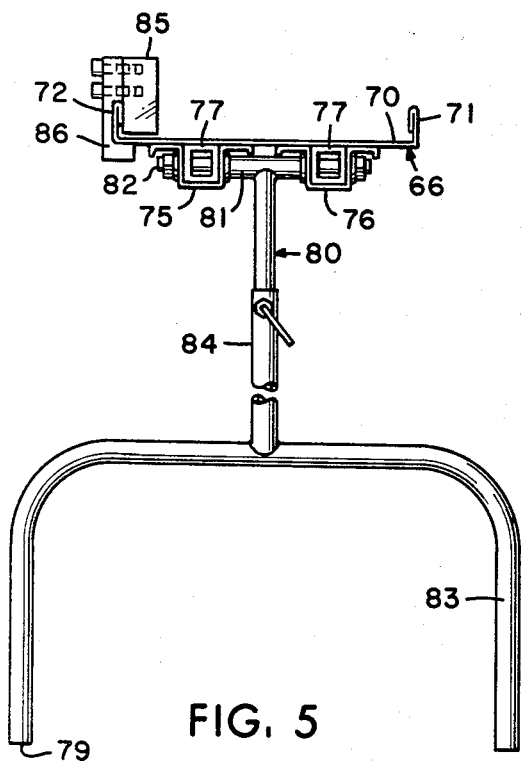
FIG. 5 is an end elevational view of the receiver and supporting leg.
Figure 10:
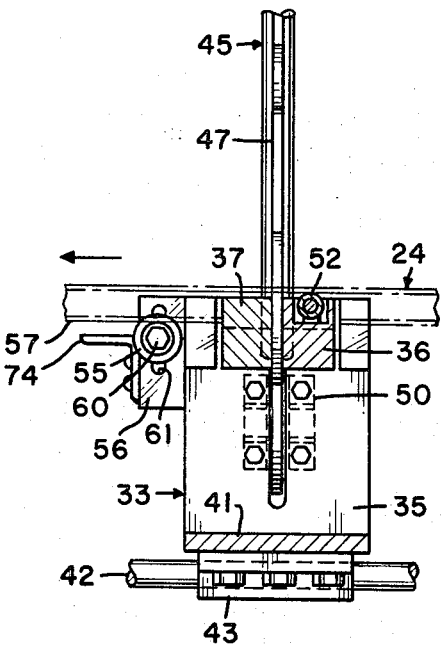
FIG. 10 is a cross sectional view of the cutting head as seen along line 10—10 of FIG. 4.

Reciprocatively mounted on the discharge end of the strip-feeding means is a cutting head indicated by 33. As is best seen in FIGS. 9 and 10, the cutting head 33 includes a pair of side plates 34 and 35 interconnected at the top by a pair of cross bars 36 and 37. The bars 36 and 37 are spaced apart to provide a blade slot 40 therebetween. A bottom plate 41 operatively interconnects the side plates 34 and 35.

Mounted on the base frame 10, and specifically located between the side rails 11 are a pair of slide bars 42 constituting tracks. The bars 42 are laterally spaced in parallel relation and extend longitudinally generally in the direction of strip travel.

Fastened to the under side of the bottom plate 41 of the cutting head 33 are a pair of slide blocks 43 constituting track followers, the blocks 43 slidably receiving and retaining the slide bars 42. During operation of the machine, the initial position of the cutting head 33 is in one limit of travel as determined by engagement of the bottom plate 41 with a transverse frame plate 44 (FIG. 3) extending between the side rails 11 and interconnecting the side upright posts 15. The cutting head 33 is movable from this one limit and is returnable to such limit by sliding action along the bars 42, in a manner and for the purpose later described.

A cutting blade indicated by 45 includes a handle 46 and an edge 47. The blade 45 is mounted on and carried by the cutting head 33. More particularly, the edge 47 is pivotally mounted to the side plate 35 of head 33 between a pair of spaced lugs 50. The pivot axis of blade 45 is substantially parallel to the direction of strip travel, and the blade 45 is arranged so that the blade 45 can be moved from its raised position illustrated in FIGS. 2 and 4 downwardly and transversely to the strip 24. The side plate 35 of cutting head 33 is provided with a vertical slot 51 that communicates with and forms a continuous part of the blade slot 40 adapted to receive the blade edge 47. The blade 45 defines a cutting plane transverse to the strip and to the path of strip travel.

The upper surface of the transverse bar 36 of cutting head 33 is recessed to receive a roller 52 rotatively mounted on such bar 36. The roller 52 engages the under side of the flat web portion of the continuous strip 24 as the strip 24 is delivered by the strip-feeding means over the cutting head 33.

At one side of the cutting head 33, there are a pair of rotatively mounted guide rollers 53, one roller 53 being located ahead of the cutting plane while the other roller 53 is located behind such cutting plane. These rollers 53 support the under side of the upwardly and reversely-turned channel 54 at one side of the continuous strip 24.

Rotatively mounted to the opposite side of the cutting head 33 is a stepped-face roller 55, best shown in FIG. 10. Specifically, the roller 55 is carried by a block 56 attached to the front of side plate 35. The smaller face of roller 55 engages the downwardly and inwardly-turned channel 57 at the opposite side of the continuous strip 24. The circumferential shoulder between the stepped faces of roller 55 engages the side of channel 57 and helps to align the strip 24 in its movement over and across the cutting head 33. The position of the roller 55 can be vertically adjusted by the location of a stub shaft 60 in a vertical slot 61 formed in block 56, whereby to accommodate the particular size of the side channel 57. The roller 52 and the side rollers 53 and 55 constitute guide means serving to retain and direct the continuous strip 24 across the cutting head 33 and across the cutting plane defined by blade 45.

Figure 3:
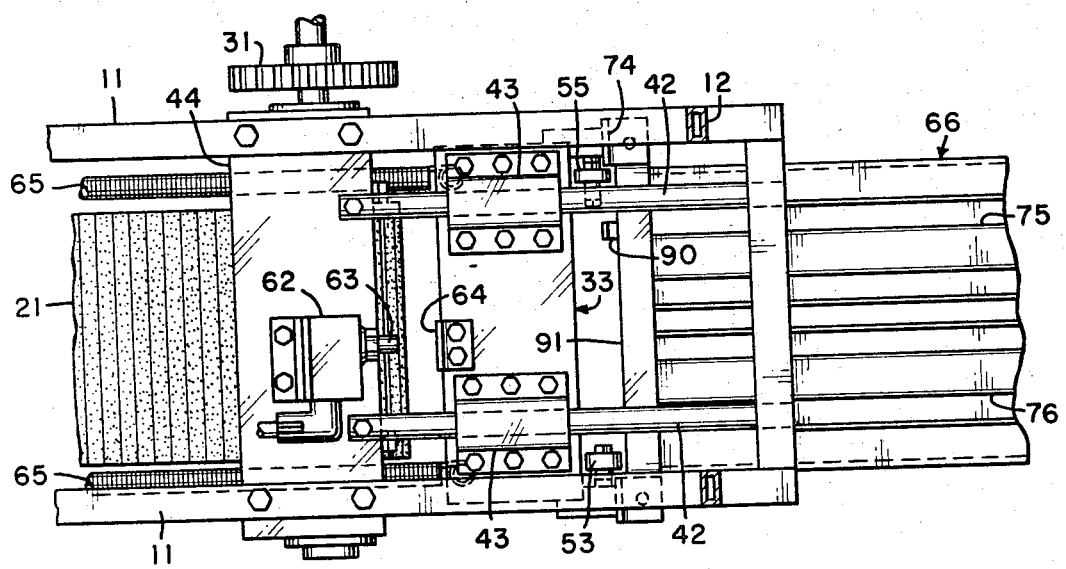
FIG. 3 is a bottom plan view of the mechanism shown in FIG. 1.
Figure 8:
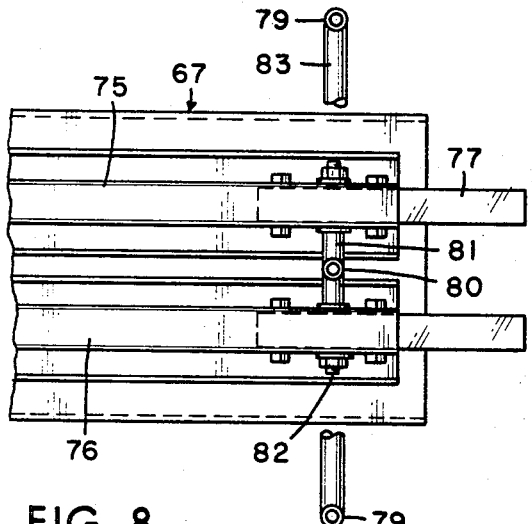
FIG. 8 is a fragmentary bottom plan view of one end of one trough section comprising the receiver.

The electrical circuit in which the motor 26 is operatively connected and by which such motor 26 is energized, includes a micro-switch 62 attached to the bottom frame plate 44, the switch 62 including an actuating button 63. A cooperating switch element 64, provided by a small angle, is attached to and carried by the bottom plate 41 of the cutting head 33. The switch element 64 engages the switch button 63 when the cutting head 33 is in its one limit whereby the switch 62 conditions the electrical circuit so that upon pressing a starting switch (not shown) in such circuit, the circuit will be energized to power the motor 26 in order to drive the belts 20 and 21, and hence deliver a continuous, formed strip 24 across the head 33 and across the cutting plane. As will be apparent upon later description of parts, when the head 33 is moved away from the said one limit to another limit as is shown in FIG. 3, the switch element 64 disengages the switch button 63 so that the switch 62 deenergizes the electrical circuit and stops the motor 26, and thereby stops the delivery of the continuous strip 24.

A pair of tension coil springs 65 operatively interconnect the base frame 10 and cutting head 33, the springs 65 constituting resilient means tending to return the head 33 to its initial position in which switch element 64 engages the cooperating switch button 63. One of the springs 65 is located at each side of the base frame immediately above the bottom frame plate 44. One end (not shown) of each spring 65 is attached to the base frame 10, while the opposite end of each spring 65 is attached to the bottom cross plate 41 of head 33.

Figure 6:
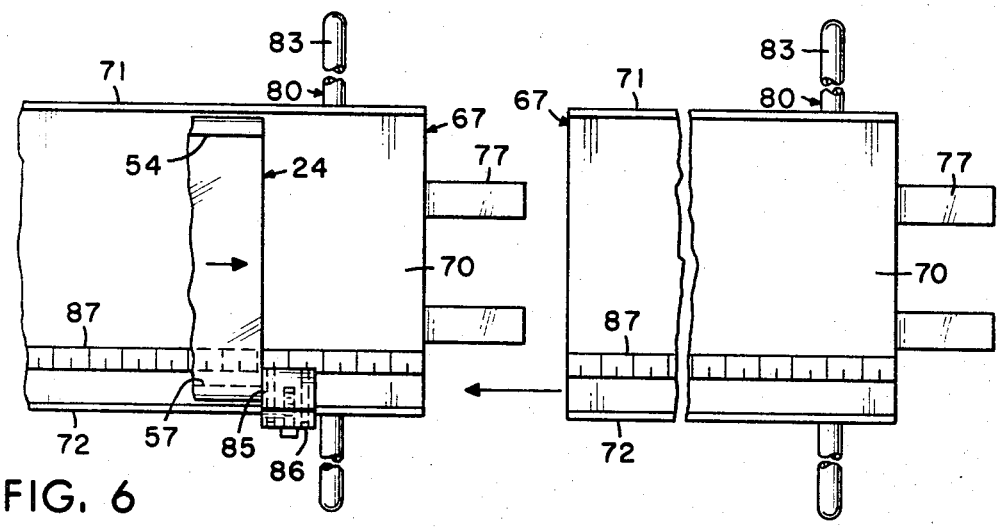
FIG. 6 is an exploded, top plan view of the trough sections comprising the receiver.
Figure 7:
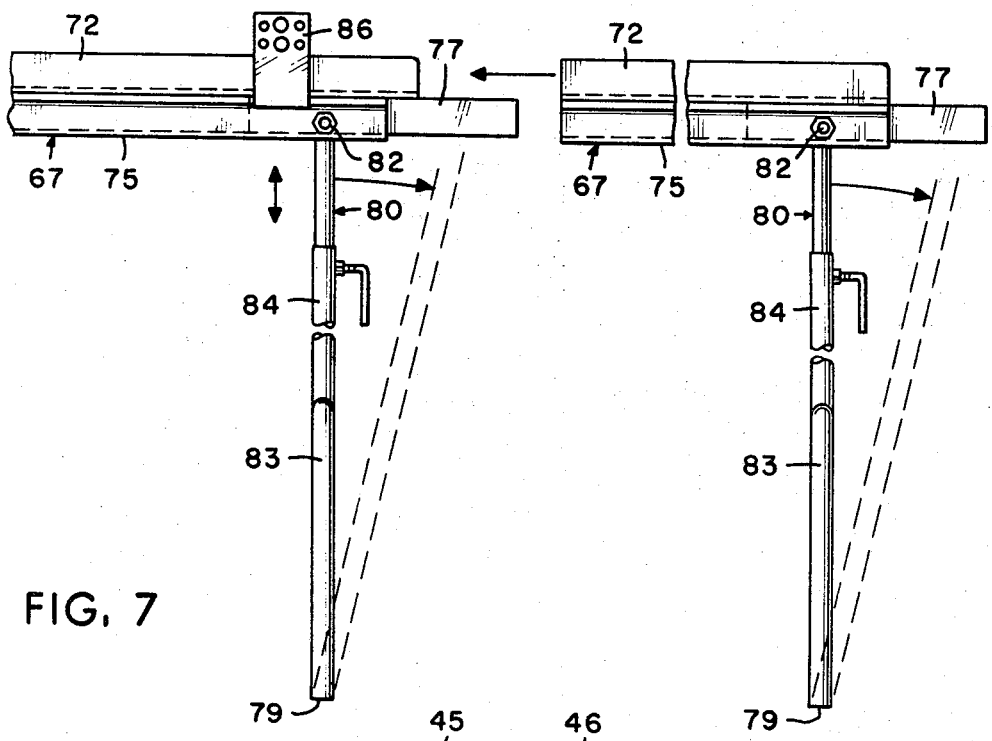
FIG. 7 is an exploded, side elevational view of the receiver shown in FIG. 6.

An elongate receiver indicated by 66 is attached to and is movable with the cutting head 33. As is best seen in FIGS. 6 and 7, the receiver 66 consists of a plurality of interconnected trough sections 67. Each trough section 67 consists of an upwardly facing U-shaped channel having a bottom wall 70 and side flanges 71 and 72. One end of the receiver 66 is attached by fasteners 73 to a pair of laterally spaced brackets 74 secured to the front of the cutting head 33. The receiver 66 extends longitudinally from one side of the cutting plane in the path of strip travel so that the continuous strip is fed into such receiver 66 so as to seat on the bottom channel wall 70 and so as to be contained by the side channel flanges 71 and 72.

Extending longitudinally along and attached to the under side of each trough section 67 are a pair of elongate channels 75 and 76. At one end of each trough section 67, a pair of square-sectioned tubes 77 are fastened within the ends of the channels 75 and 76, the tubes 77 extending beyond the end of the associated trough section and adapted to interfit the open ends of the corresponding channels 75 and 76 of the next adjacent trough section 67, whereby adjacent trough sections 67 are operatively interconnected. It will be understood that as many trough sections 67 as are needed to provide a receiver of a desired length are quickly and easily interconnected.

A supporting means mounts the receiver 66 so that the receiver 66 can move longitudinally and reciprocatively with the cutting head 33. This supporting means includes a plurality of legs 80, one of which is associated with each trough section 67. Each leg 80 includes a transverse portion 81 extending between and pivotally connected by a pin 82 to the channels 75 and 76. The leg 80 includes an inverted, substantially U-shaped base portion 83, the lower extremities 79 of which seat on a subjacent supporting surface such as the ground. A telescopically related and connected portion extends between and interconnects the transverse pivoted portion 81 and the base portion 83, the length of the intervening telescopically related portion 84 being selectively adjusted to accommodate the ground contour and to hold the receiver 66 at the desired height.

As the receiver 66 moves reciprocatively and longitudinally in the direction of strip travel, with the cutting head 33, the legs 80 will swing or pivot about the engagement of the lower leg extremities 79, such swinging movement being permitted by the pivotal connection of such legs with the trough sections 67.

A block 85 constituting a stop means is located in and at a predetermined location within the receiver 66, the block 85 being attached to trough flange 72 by an embracing, substantially L-shaped bracket 86. A tape 87 has one end 90 detachably fastened to the forward edge 91 of receiver 66, the tape 87 extending lengthwise of such receiver 66 to indicate the distance from the cutting plane defined by the blade 45. If it is desired to cut a strip of a certain length, the stop block 85 is fastened to flange 72 at the place indicating such distance on the tape 87, which is the predetermined distance from the cutting plane. After the stop block 85 is secured in place, the tape 87 can be removed if desired. The distance between the stop block 85 and the cutting plane is maintained at all times during movement of the cutting head 33 and receiver 66 in view of the fact that the head 33 and receiver 66 are rigidly attached together and move as a unit.

Figure 11:
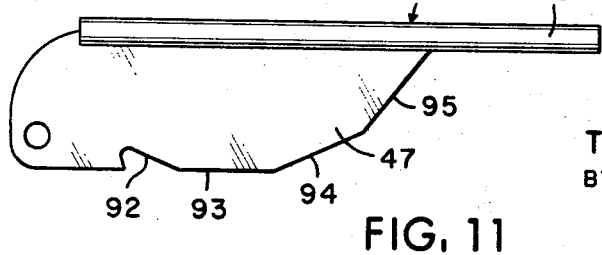
FIG. 11 is a side elevational view of the cutting blade.

The detailed configuration of the blade edge 47 is best shown in FIGS. 4 and 11. The edge 47 is shaped particularly so as to provide the most efficient shearing action in cutting all parts of the strip 24. For example, the edge portion 92 is disposed so as to strike the upper corner of side strip channel 57, and is angularly disposed relative to the side of such channel to the inturned channel tip and to the integral strip web so as to pass at a greatly inclined angle through such strip portions for effective shearing action as the blade 45 is swung downwardly. The next adjacent edge portion 93 is angularly disposed relative to the edge portion 92 so that such edge portion 93 presents an inclined cutting edge to another, yet adjacent, portion of the strip web for shearing action as the rotation of the blade continues downwardly. Still another edge portion 94 is angularly related to the adjacent edge portion 93 so that this edge portion 94 presents an inclined cutting edge for shearing action for the remaining portion of the strip web. The next adjacent edge portion 95 is inclined relative to the edge portion 94 so that an inclined cutting edge is presented to the side strip channel 54 for completion of the cut and for effective shearing action as the blade 45 is lowered fully.

With the blade configuration as defined by the angular relation of the blade edge portions 92–95 inclusive, all portions of the strip including all portions of the side channels 54 and 57 and the intervening web are cut by a shearing action rather than being pinched or compressively cut substantially parallel to the strip surfaces such as would cause deformation of the strip. The shearing or slicing action of blade 45 causes a clean cut of all portions of the strip without any deformation.

It is thought that the usage and functional advantages of the strip-feeding and shearing mechanism have become fully apparent from the foregoing detailed description of parts, but for completeness of disclosure the operation will be briefly described.

It will be assumed that the cutting head 33 is in its retracted initial position in which the switch element 64 engages the switch button 63, and that the cutting blade 45 is in its raised position illustrated in full lines in FIG. 4. A suitable number of trough sections 67 are operatively interconnected endwise by interfitting the tubes 77 of each trough section 67 with the compatible channels 75 and 76 of the next adjacent trough section 67. The legs 80 are swung downwardly and adjusted as to height to seat on the ground and to hold the receiver 66 substantially in a horizontal plane.

The elongate continuous strip 24 is fed into and through the belts 20 and 21 from a roll, the strip 24 being shaped by the forming rolls 25 and discharged by the belts 20 and 21 over the cutting head 33 and into engagement with the guide rollers 52, 53 and 55. The strip 24 is delivered across the cutting plane defined by blade 45 and is fed into the receiver 66.

The stop block 85 is located a predetermined distance from the cutting plane, is fixed to the receiver flange 72, and is disposed in the path of strip travel. The position of the stop block 85 determines with precision the length of the strip to be formed and cut. This length is measured by a tape 87 having its hook 90 fastened to the front receiver edge 91 and extending longitudinally along the receiver closely adjacent the receiver flange 72. After the stop block 85 is located, the tape 87 can be conveniently removed by detachment of the hook 90 from the receiver edge 91.

As the elongate and formed, continuous strip is fed into the receiver 66, the forward end of the strip engages the stop block 85. Upon continued feeding of the strip into the receiver 66, the stip end engaging the stop block 85 causes longitudinal movement of the receiver 66, and hence causes corresponding movement of the cutting head 33 away from its original position and against the loading the springs 65. The lower extremities 79 of the supporting legs 80 engage and pivot on the ground to permit this longitudinal movement of the receiver 66. Because the cutting head 33 and the receiver 66 move as a unit, the predetermined distance between the cutting plane and the stop block 85 is maintained, and hence, the strip length determined by this predetermined distance is accurately maintained.

As the cutting head 33 moves away from its initial position, the switch element 64 disengages from the switch button 63, and opens the switch 62 to deenergize the electrical circuit in which the motor 26 is operatively connected. The motor 26 stops and the feeding action of the belts 20 and 21 is simultaneously stopped. However, the continuous strip is held securely between the belts 20 and 21, and hence is held in the extended position with the strip end in abutment against the stop block 85.

The operator then severs the strip to the correct length by actuating the blade 45. As the blade edge 47 moves in the cutting plane, the edge portions 92–95 inclusive shear the strip in the manner previously described cleanly without any bending or deformation to any of the strip portions. When the strip is completely cut, the severed strip length is removed from the receiver 66. When the blade 45 is raised so as to remove the blade edge 47 from in front of the unsevered strip portion held by the feeding mechanism, the springs 65 urge the cutting head 33 back to its original position. Again, because the receiver 66 is securely attached to and movable with the head 33, the receiver moves longitudinally as permitted by the swinging action of the supporting legs 80.

As the cutting head 33 returns to its initial limit, the switch element 64 engages the switch button 63, and thereby closes the switch 62 to condition the electrical circuit for energization. Upon this return movement of the cutting head 33, the end of the continuous strip is retained on and by the guide rollers 52, 53 and 55, constituting the guide means, and moves across the cutting plane. A starting button in the electrical circuit is then punched to energize the electrical circuit and start the motor 26 for operation of the belts 20 and 21 to deliver another strip length.

Although the invention has been described by making detailed reference to a single preferred embodiment, such detail is to be understood in an instructive, rather than in any restrictive sense, many variants being possible within the scope of the clams hereunto appended.

I claim as my invention:

1. A strip-feeding and shearing mechanism, comprising:
   (a) a cutting head,
   (b) a blade mounted on the head and defining a cutting plane,
   (c) means mounting the head for movement between limits,
   (d) a receiver attached to and movable with the cutting head, the receiver extending from one side of the cutting plane,
   (e) means feeding a strip across the cutting plane and into the receiver,
   (f) a stop means connected to the receiver a predetermined distance from the cutting plane, the strip engaging the stop means to move the receiver and cutting head from one limit to another, the strip length between the stop means and cutting plane being maintained upon such movement of the head and receiver, and
   (g) an electrical circuit controlling the feeding means, the circuit including a switch actuated by the position of the cutting head and conditioning the circuit by movement of the cutting head from said one limit so as to halt the strip-feeding means.

2. A strip-feeding and shearing mechanism, comprising:
   (a) a cutting head,
   (b) a blade mounted on the head and defining a cutting plane,
   (c) means mounting the head for movement between limits,
   (d) a receiver attached to and movable with the cutting head, the receiver extending from one side of the cutting plane,
   (e) means feeding a strip across the cutting plane and into the receiver,
   (f) a stop means connected to the receiver a predetermined distance from the cutting plane, the strip engaging the stop means to move the receiver and the cutting head from one limit to another, the strip length between the stop means and cutting plane being maintained upon such movement of the head and receiver,
   (g) the strip-feeding means holding the cutting head in the said other limit by engagement of the strip with the stop means, and
   (h) the blade being actuated to shear the strip while the head is located in said other limit.

3. A strip-feeding and shearing mechanism, comprising:
   (a) a cutting head,
   (b) a blade mounted on the head and defining a cutting plane,
   (c) means mounting the head for movement between limits,
   (d) a receiver attached to and movable with the cutting head, the receiver extending from one side of the cutting plane,
   (e) feeding means delivering a strip across the cutting plane and into the receiver,
   (f) a stop means connected to the receiver a predetermined distance from the cutting plane, the strip engaging the stop means to move the receiver and cutting head from one limit to another, the strip length between the stop means and cutting plane being maintained upon such movement of the head and receiver,
   (g) the feeding means holding the cutting head in said other limit by engagement of the strip with the stop means,
   (h) the blade being actuated to shear the strip while the head is located in said other limit, and
   (i) means connected to the cutting head returning the head to said one limit after severance of the strip by the blade.

4. A strip-feeding and shearing mechanism, comprising:
   (a) a cutting head,
   (b) a blade mounted on and carried with the head and defining a cutting plane,
   (c) means mounting the head for movement between limits,
   (d) a receiver attached to and movable with the cutting head, the receiver extending from one side of the cutting plane,
   (e) feeding means delivering a strip across the cutting plane and into the receiver,
   (f) a stop means connected to the receiver a predetermined distance from the cutting plane, the strip engaging the stop means to move the receiver and cutting head from one limit to another, the strip length between the stop means and cutting plane being maintained upon such movement of the head and receiver,
   (g) the strip feeding means holding the cutting head in the said other limit by engagement of the strip with the stop means,
   (h) the blade being actuated to shear the strip while the head is located in said other limit, the blade engaging the strip upon severance to preclude return of the cutting head to the said one limit until the blade is removed from the strip path, and
   (i) means connected to the cutting head returning the head to said one limit.

5. A strip-feeding and shearing mechanism as defined in claim 4, in which:
   (j) the means returning the head to the said one limit comprises a resilient element connected to the cutting head, the cutting head being moved from said one limit against the loading of the resilient element, and the resilient element returning the head to the said one limit after severance of the strip by the blade.

6. A strip-feeding and shearing mechanism, comprising:
   (a) a cutting head,
   (b) a blade mounted on the head and defining a cutting plane,
   (c) means mounting the head for movement between limits,
   (d) a receiver attached to and movable with the cutting head, the receiver extending from one side of the cutting plane,
   (e) feeding means delivering a strip across the cutting plane and into the receiver,
   (f) a stop means connected to the receiver a predetermined distance from the cutting plane, the strip engaging the stop means to move the receiver and head, (g) an electrical circuit controlling the feeding means, the circuit including a switch actuated to condition the circuit to halt the feeding means as the head is moved from one limit to another limit upon engagement of the strip with the stop means, and (h) means connected to the head and returning the head to the said one limit to actuate the switch and condition the circuit for starting the feeding means.

7. A strip-feeding and shearing mechanism, comprising:

(a) a cutting head, (b) a blade mounted on the head and defining a cutting plane, (c) means mounting the head for movement between limits, (d) a receiver attached to and movable with the cutting head, the receiver extending from one side of the cutting plane, (e) feeding means delivering a strip across the cutting plane and into the receiver, (f) a stop means connected to the receiver a predetermined distance from the cutting plane, the strip engaging the stop means to move the receiver and head therewith, (g) an electrical circuit controlling the feeding means, the circuit including a switch actuated to condition the circuit to halt the feeding means as the head is moved from one limit to another limit upon engagement of the strip with the stop means, the strip length between the stop means and cutting plane being maintained as the head moves to the said other limit, (h) the blade severing the extended strip length and engaging the strip to hold the head in the said other limit, and (i) resilient means connected to the head and returning the head and receiver to the said one limit upon disengagement of the blade from the strip, (j) the switch being actuated upon return of the head to said one limit to condition the circuit for starting the feeding means.

8. A strip-feeding and shearing mechanism, comprising:

(a) a cutting head, (b) a blade mounted on the head and defining a cutting plane, (c) means mounting the head for movement between limits, a receiver attached to and movable with the cutting head, the receiver extending from one side of the cutting plane, (d) feeding means delivering a strip across the cutting plane and into the receiver, (e) guide means on the head retaining and directing the strip across the cutting plane and into the receiver, (f) a stop means connected to the receiver, the strip engaging the stop means to move the receiver and head, (g) means associated with the feeding means and actuated by movement of the head from one limit to halt the feeding means, and (h) resilient means connected to the head and returning the head to the said one limit after severance of the strip by the blade, (i) the guide means retaining connection with the unsevered portion of the strip associated with the feeding means upon return movement of the head.

9. A strip-feeding and shearing mechanism as defined in claim 8, in which:

(j) the guide means directs the unsevered portion of the strip across the cutting plane upon return movement of the head.

10. A strip-feeding and shearing mechanism, comprising:

(a) a cutting head, (b) a blade mounted to the head and defining a cutting plane, (c) means mounting the head for movement between limits, (d) an elongate receiver attached to and movable with the cutting head, the receiver extending longitudinally from one side of the cutting plane, (e) feeding means delivering a strip across the cutting plane and into the receiver, (f) a stop means connected to the receiver, the strip engaging the stop means to move the receiver and head, (g) means supporting and mounting the receiver for longitudinal movement between limits with the cutting head, (h) means associated with the feeding means and actuated by movement of the head from one limit to halt the feeding means, and (i) resilient means connected to the head and returning the head to the said one limit after severance of the strip by the blade.

11. A strip-feeding and shearing mechanism as defined in claim 10, in which:

(j) the means supporting the receiver comprise legs pivotally attached to the receiver and seating on a subjacent surface, the legs swinging to accommodate longitudinal movement of the receiver and cutting head between limits.

12. A strip-feeding and shearing mechanism as defined in claim 10, in which:

(j) the receiver includes a plurality of elongate trough sections selectively connected together to provide a receiver of the desired length.

13. A strip-feeding and shearing mechanism, comprising:

(a) a cutting head, (b) a blade mounted to the head and defining a cutting plane, (c) means mounting the head for movement between limits, (d) a receiver attached to and movable with the cutting head, the receiver extending from one side of the cutting plane, (e) feeding means delivering a strip across the cutting plane and into the receiver, (f) guide means on the head retaining and directing the strip across the cutting plane and into the receiver, (g) a stop means connected to the receiver, the strip engaging the stop means to move the receiver and head therewith, (h) an electrical circuit controlling the feeding means, the circuit including a switch actuated to deenergize the circuit and halt the feeding means as the head is moved from one limit to another limit upon engagement of the strip with the stop means, and (i) resilient means connected to the head and returning the head to the said one limit after severance of the strip by the blade, (j) the guide means retaining connection with the unsevered portion of the strip associated with the feeding means and directing such strip portion across the cutting plane upon return movement of the head.

14. A strip-feeding and shearing mechanism, comprising:

(a) a frame, (b) a strip-feeding means mounted on the frame, (c) a power unit operating the strip-feeding means, the power unit including an electrical circuit having an actuating switch mounted on the frame, (d) a cutting head at the discharge side of the strip-feeding means, (e) a track means on the frame mounting the head for reciprocative movement in the direction of strip travel,
(f) a blade mounted on the head and defining a cutting plane transverse to the strip,
(g) an elongate receiver attached to and movable with the cutting head, the receiver extending longitudinally from one side of the cutting plane,
(h) a stop means connected to the receiver a predetermined distance from the cutting plane,
(i) a switch-actuating means carried by the head and coacting with the switch to condition the circuit for energization to operate the strip-feeding means, the strip-feeding means delivering a strip across the cutting plane, into the receiver, and into engagement with the stop means to move the head from one limit,
(j) the switch-actuating means and switch acting to de-energize the circuit to stop the strip-feeding means as the head moves from the one limit,
(k) the strip length between the stop means and cutting plane being maintained as the head moves from said one limit,
(l) the blade severing the strip, and
(m) resilient means connected to the head and returning the head to said one limit after severance of the strip by the blade,
(n) the switch-actuating means and switch acting to recondition the circuit for energization of the strip-feeding means upon return of the head to the said one limit.

15. A strip-feeding and shearing mechanism as defined in claim 14, in which:
(o) a guide means is mounted on the head to retain and direct the strip across the cutting plane and into the receiver, the guide means retaining connection with the unsevered portion of the strip associated with the feeding means and directing that portion of the strip across the cutting plane upon return movement of the head to said one limit, and
(p) the blade engages the end of the last said strip portion to preclude return of the cutting head to said one limit until the blade is removed from the strip path.

16. A strip-feeding and shearing mechanism as defined in claim 15, in which:
(q) the track means on the frame comprise a plurality of slide bars extending in the direction of strip travel,
(r) the cutting head includes followers riding on the slide bars for reciprocative movement of the cutting head, and
(s) the resilient means comprises a spring interconnecting the cutting head with the frame.

References Cited
UNITED STATES PATENTS 1,911,150    5/1933    Hallden _____ 83—310 X ANDREW R. JUHASZ, *Primary Examiner.*

U.S. Cl. X.R.

83—607, 522